United States Patent [19]

Houldsworth

[11] Patent Number: 4,528,754
[45] Date of Patent: Jul. 16, 1985

[54] SELF-PROPELLED DRAWING DEVICE OR TRACING DEVICE

[75] Inventor: John Houldsworth, Washington, England

[73] Assignee: Chessell Limited, West Sussex, England

[21] Appl. No.: 479,799

[22] Filed: Mar. 28, 1983

[30] Foreign Application Priority Data

Mar. 29, 1982 [GB] United Kingdom ............... 8209195

[51] Int. Cl.³ .................... B43L 13/00; G01D 15/16
[52] U.S. Cl. .................... 33/18 R; 33/1 C; 346/139 R
[58] Field of Search ........... 33/1 M, 1 C, 18 R, 18 B, 33/26, 27 R, 32 C, 35; 46/210; 346/139 R, 139 C

[56] References Cited

U.S. PATENT DOCUMENTS 3,568,321  3/1971  Maps et al. ................... 33/18 R
3,683,411  8/1972  Ikeda ........................... 346/139 R Primary Examiner—Richard R. Stearns
Attorney, Agent, or Firm—Sandler & Greenblum

[57] ABSTRACT

A self-propelled drawing device is driven by two independent wheels whose axes are fixed, and has a writing tip which marks the drawing medium at a point which is not on the imaginary line joining the points of contact of the wheels with the drawing medium. The drawing device is connected to a stationary control device by flexible conductors in the form of a ribbon whose width lies in a vertical plane. Instead of a drawing device, the device can be arranged as a tracing device with counters on the wheels and a tracing tip instead of the writing tip.

15 Claims, 11 Drawing Figures

SELF-PROPELLED DRAWING DEVICE OR TRACING DEVICE

BACKGROUND OF THE INVENTION

In general terms, the present invention relates to a self-propelled drawing device or a tracing device which can be for example an output peripheral for a desk top computer. The drawing device can be referred to as an "X-Y plotter". During the drawing, it should be able to access substantially all of the drawing medium. The drawing device draws a desired trajectory or locus or suitable approximation thereto as defined by computing or calculating means. The data to be plotted is held as a series of vectors in computer memory. Each vector is converted to the necessary movements required to reproduce the data on the drawing medium. The conversion calculations from vectors to movements may be carried out in the desk top computer, or in the drawing device or in a secondary device which interfaces between the two. The tracing device works in reverse in that it is made to follow a line by manual propulsion, and signal the trajectory or locus of the line or a suitable approximation thereto to computing or storage means. Both the drawing device and the tracing device act as a drafting peripheral in the form of a locus-tracking device in that the drawing device tracks a locus in order to draw a line and the tracing devices tracks a locus on a planar medium.

FIRST ASPECT OF THE INVENTION—BACKGROUND

One aspect of the invention relates to a self-propelled drawing device for moving upon a drawing medium, the drawing device comprising two independently-driven rotary members for rolling on the drawing medium and driving the drawing device, the axes of the rotary members being fixed relative to the drawing device, whereby the path followed by the drawing device is determined by the individual rotations of the rotary members, and at least one writing means which will mark the drawing medium. The invention also relates to a tracing device comprising two independently-rotatable rotary members for rolling on the medium, the axes of the rotary members being fixed relative to the tracing device, whereby the individual rotations of the rotary members correspond to the path followed by the tracing device, means connected to the rotary members for sensing and signalling the individual rotations of the rotary members, and at least one tracing means which can be moved by manual propulsion of the tracing device. Where the device is a tracing device, the tracing means may be for instance a digitizing sight or lightspot, as is well known. The tracing means need not necessarily be traced along a line, but could for instance be laid over a point of interest whose coordinates are communicated to or calculated or inferred by suitable electronic apparatus.

U.S. Pat. No. 3,726,019 describes a drawing device having a steerable driving wheel and two idle wheels. The writing means can be off the common axis of the idle wheels. The movement of the device is restricted. To draw a straight line, the device must first position itself with the axis of the idle wheels at right angles to the line. WO 81/03561 describes a drawing device (FIG. 2) in which there are two independently-driven, coaxial driving wheels and two castors. The writing means is on the common axis of the driving wheels. This device lacks one degree of freedom in that in order to draw a straight line, it must first position itself with the axis of the driving wheels at right angles to the line. The arrangement of the device is such that the driving wheels must have identical effective diameters and be a precisely determined distance apart. The device cannot draw near the edge of the paper. GB 2 015 755 describes a complex device (FIGS. 7 and 8). In U.S. Pat. No. 3,726,019, and WO 81/03561 and to a certain extent in GB 2 015 755, if a sharp curve is to be drawn, considerable activity is required for steering, out of proportion to the actual length of line being drawn; for instance annotation with characters or other small symbols would be slow.

THE INVENTION—FIRST ASPECT

In accordance with the first aspect of the invention, the rotary members are independent and have their axes fixed relative to the drawing device or tracing device—in the case of the drawing device the rotary members are independently driven whilst in the case of the tracing device, the individual rotations of the rotary membrs correspond to the path followed by the tracing device. Furthermore, the writing means of the drawing device is arranged to mark the drawing medium at a point which is not on the imaginary line joining the points of contact of the rotary members with the drawing medium, or the tracing means is arranged such at any moment it traces at a point which is not on the imaginary line joining the points of contact of the rotary members with the medium. The device of the invention can be of small size and have low inertia and mass. By having two independently-driven rotary members and a writing means not on said imaginary line, the writing means has an extra degree of freedom. The rotary members are referred to for convenience herein as "driving wheels", though it will be understood they could for instance be shaft ends. They do not slip either sideways or tangentially, but only roll in the direction at right angles to their axes. By controlling the relative velocities of the driving wheels, the driving wheels and therefore the whole drawing device can be made to rotate any amount about any chosen point on said imaginary line—no complex steering mechanism is required. Thus by choosing an appropriate point and sense of rotation, the writing means, which is off said imaginary line, may be instantaneously moved in any direction and therefore incrementally made to follow or reconstruct any given locus at constant speed along the locus, irrespective of the orientation of the drawing device provided it is not at the edge of the drawing medium. For instance, straight lines can be drawn without any pre-positioning of the device, whatever the orientation of the device. This improves accuracy and also reduces "dead" time. Small radius curves can be drawn at the same speed as straight lines so that the device can be suitable for writing characters or symbols.

The device can, with some sacrifice of net line speed, be arranged to plot near the edge of the paper while the device itself does not leave the paper.

In its simplest form, the drawing device need have only three moving parts, namely two motors with the respective driving wheels and a pen lift or other mechanism for preventing the writing means marking the drawing medium.

The writing means (or tracing means) can be positioned arbitrarily on the device. There can be multiple writing means on the device, in which case it is easier if they are all the same distance from said imaginary line. The different writing means may be for instance different writing tips to suit different drawing media or may have different attributes, such as colour or line-width. In general terms, any writing means could be used, for instance a felt-tipped pen or a dot-matrix needle printing head. The writing means may be fixed, or an arrangement may be included for tilting the device about the driving wheels to bring the writing means in contact with the drawing medium, or there may be lifts for the writing means. If desired, there may be a magazine or rotating carousel for changing the writing means at the same position. If the drawing means can be withdrawn from the drawing medium, an idle support, e.g. a castor or low-friction sliding shoe, can be provided for giving proper support to the device.

The driving wheels need not be of precisely the same effective diameter. Two devices can be used simultaneously or concurrently to produce different parts of the same drawing or different colours.

The relative movements of the driving wheels can be calculated and/or controlled by suitable electronic apparatus such as a microprocessor or microcomputer accommodated on the device itself or communicating with it by a flexible connection or remote control signal. The remote control signal could be an infra-red signal. For powering the driving wheels and e.g. pen lifts, there may be an energy storage means (normally a battery) moving with the device, or for instance a flexible connection for the power.

SECOND ASPECT OF THE INVENTION—BACKGROUND

Another aspect of the invention relates to a self-propelled drawing device for moving upon a drawing medium connected to a stationary control device which controls the movement of the drawing device by means of flexible conductors connected to the drawing device and to the control device. The invention also relates to a tracing device for being moved upon a medium and arranged to give signals corresponding to the movement of the tracing device, connected to a stationary receiving device for receiving said signals by means of flexible conductors connected to the tracing device and to the receiving device.

THE INVENTION—SECOND ASPECT

In accordance with the second aspect of the invention, the flexible conductors are in the form of a ribbon which is connected to the drawing or tracing device and to the control or receiving decive with its width vertical. The ribbon (which may alternatively be called a tape) can transmit all power and control signals. In the preferred version, the ribbon stands on edge; it is arranged never to be straight and will always support itself vertically assuming a serpentine configuration as shown in FIG. 1; unlike other umbilical cords, the ribbon is extremely supple in the plane of the paper, and can never go under the wheels. In another version, the ribbon can tend to roll up and apply light tension to itself, excess ribbon being accomodated in a circular housing in said control or receiving device—in this version the ribbon need not touch the drawing medium. The drawing device can be programmed so that it does not wind the ribbon around itself. The ribbon can be connected to the drawing or tracing device and to the control or receiving device slightly above the level of the drawing medium, for instance 2 to 3 mm, to avoid manufacturing tolerances causing the ribbon to project below and support some of the weight of the drawing or tracing device. With suitable arrangement, problems such as picking up the corner of the drawing medium can be avoided.

PREFERRED EMBODIMENTS

The invention will be further described, by way of example, with reference to the accompanying drawings, in which.

Figure 2:
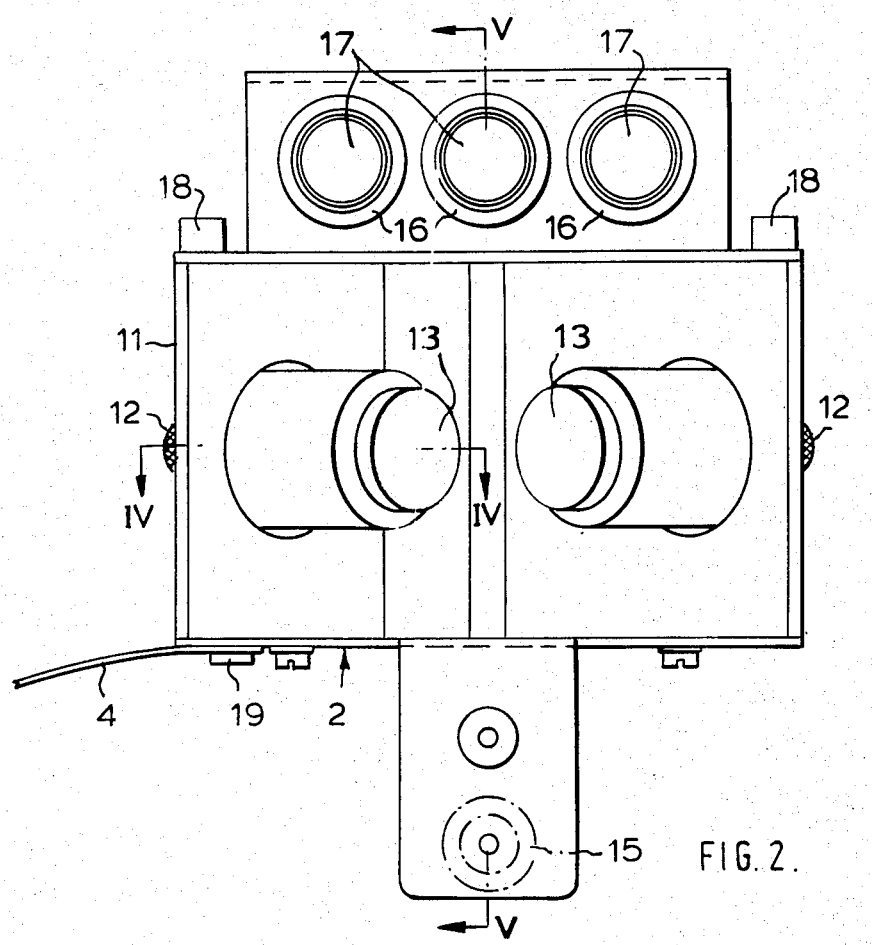
FIG. 2 is a plan of a plotter head in accordance with the invention.
Figure 3:
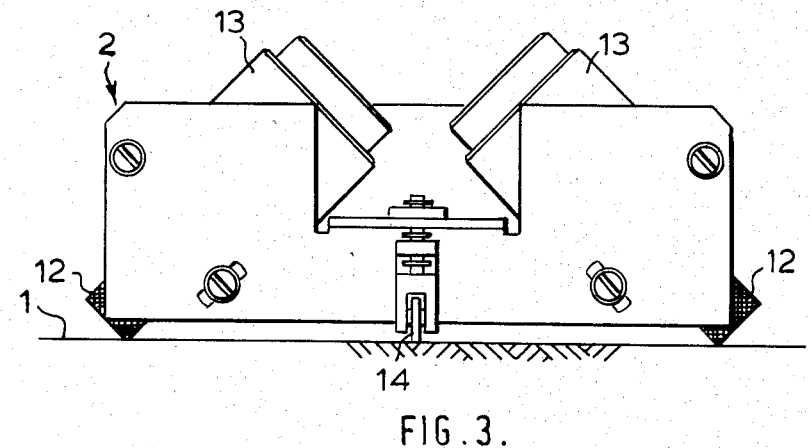
FIG. 3 is a rear end view of the plotter head of FIG. 2.
Figure 4:
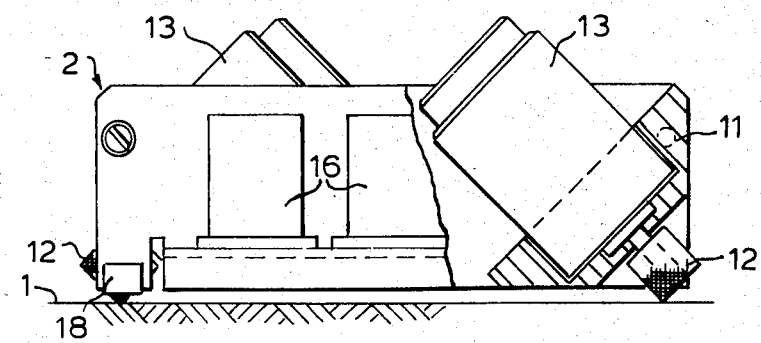
FIG. 4 is a front end view of the plotter head of FIG. 2, partly in section along the line IV—IV in FIG. 2.
Figure 5:
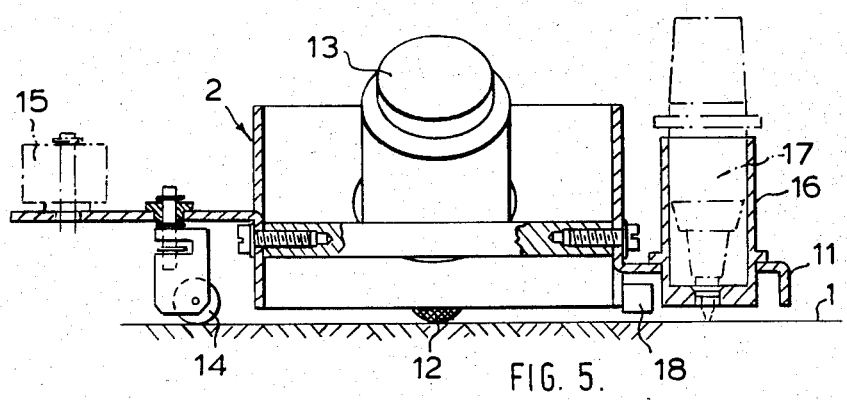
FIG. 5 is a section along the line V—V in FIG. 2.
Figure 8:
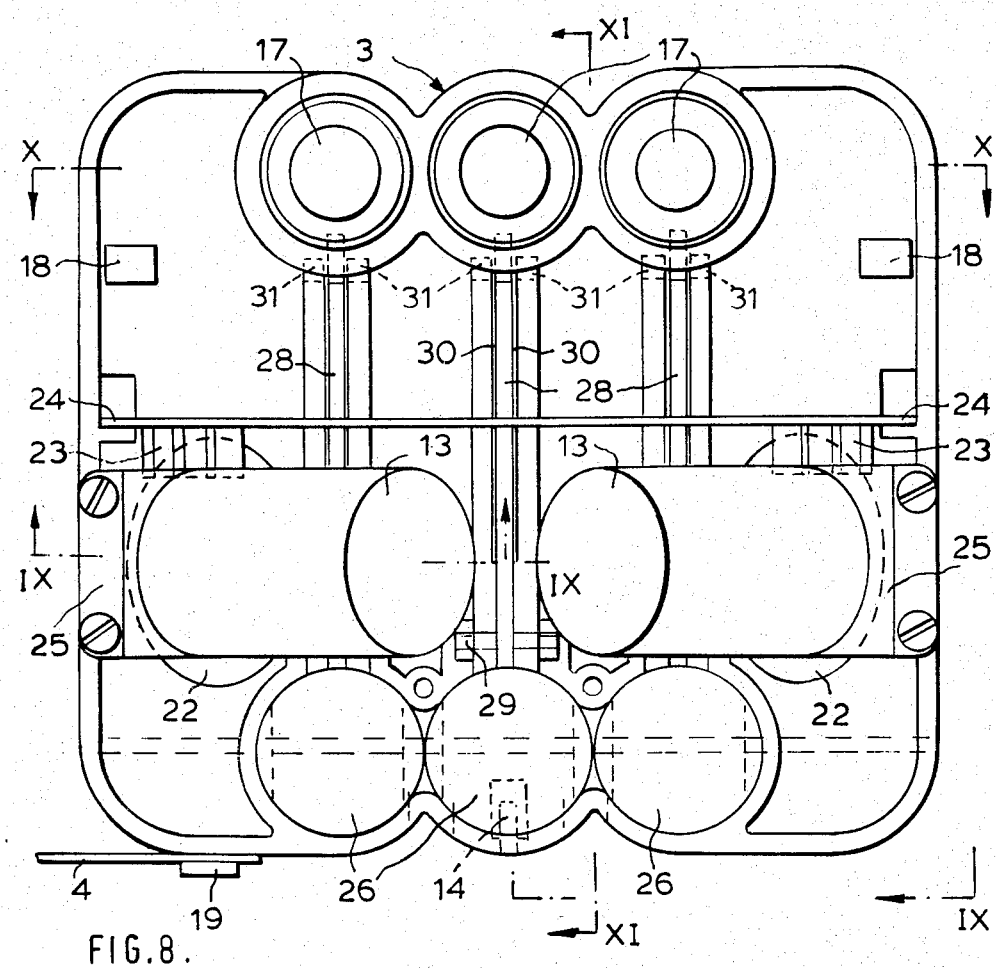
Figure 9:
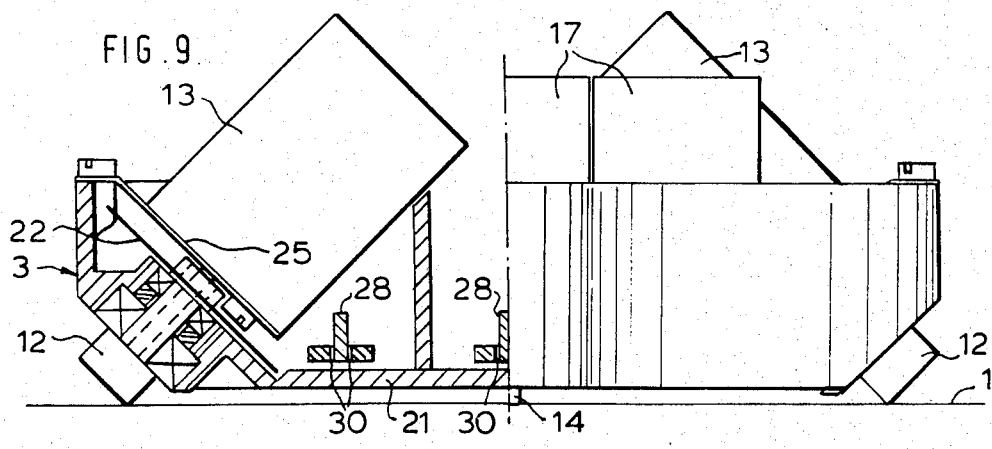
Figure 10:
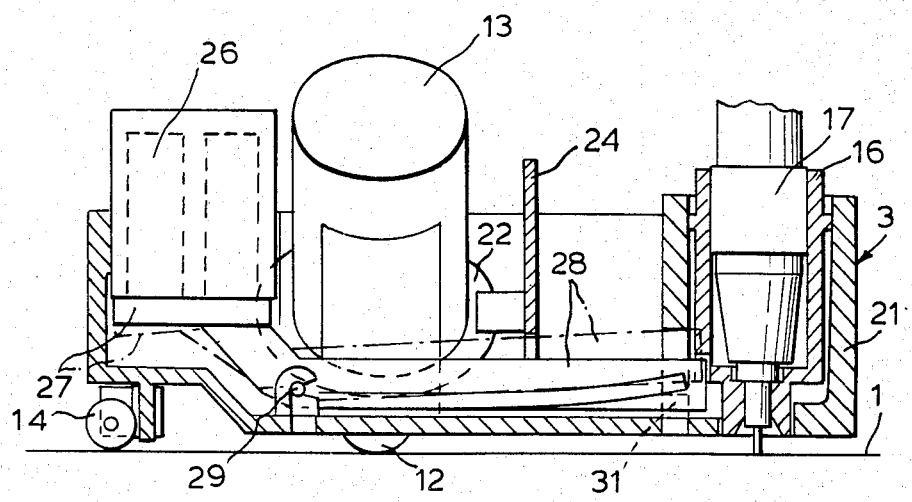
Figure 11:
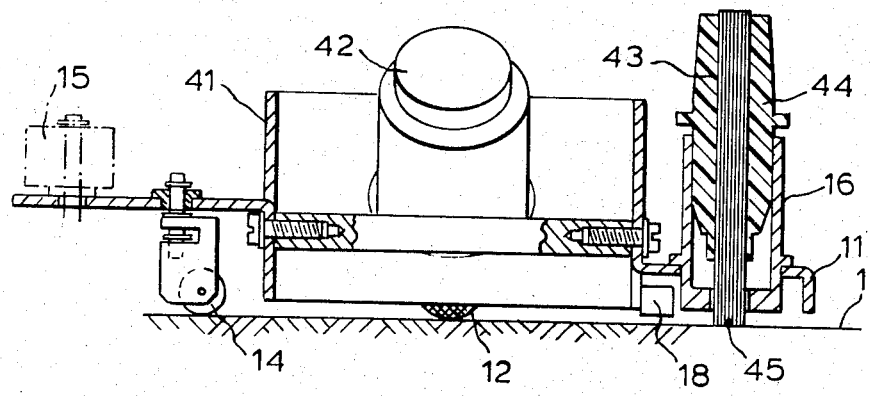

FIGS. 8 to 10 correspond generally to FIGS. 2, 3 and 5, but show a different plotter head; and FIG. 11 corresponds to FIG. 5 but shows a tracer in accordance with the invention.

Figure 1:
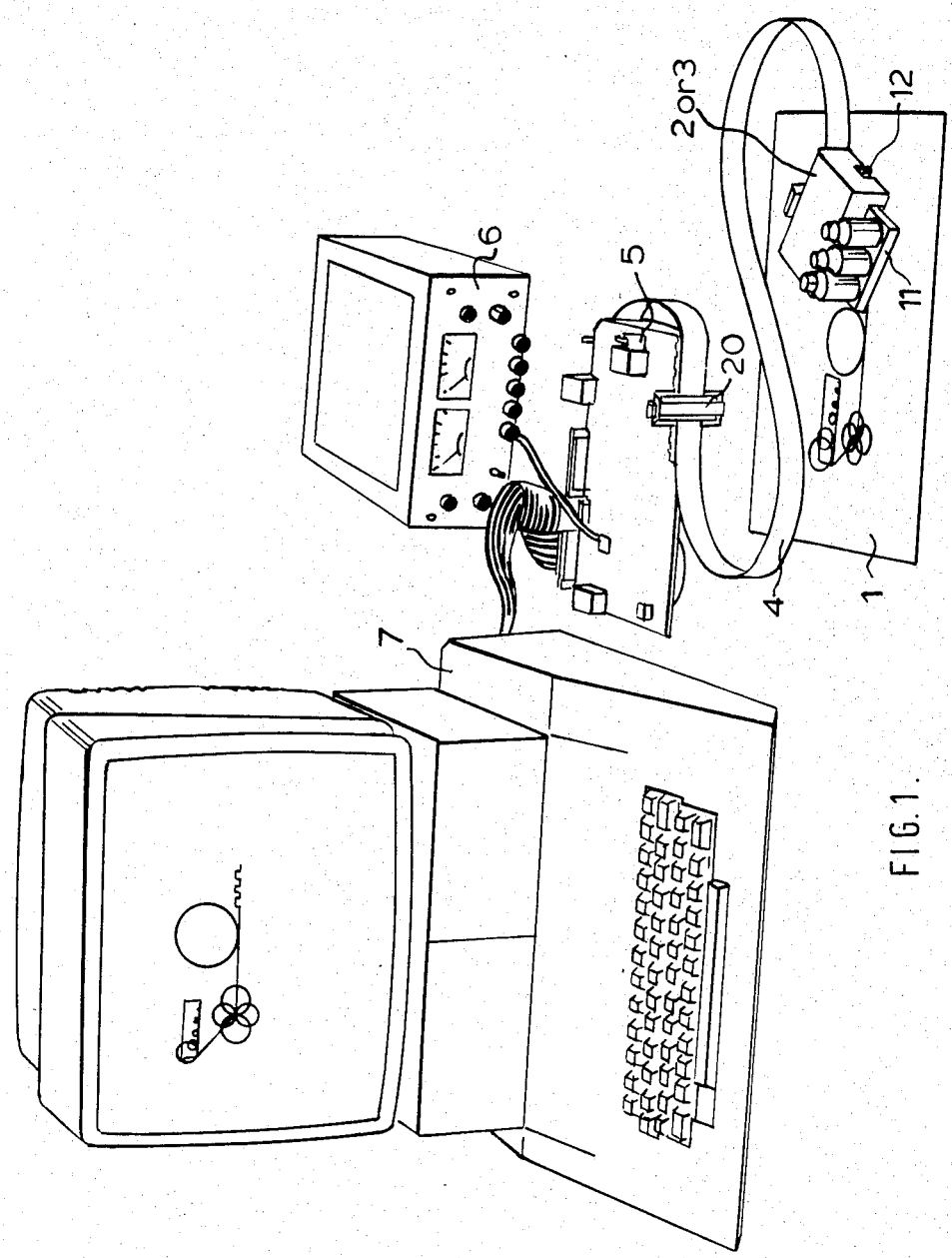
FIG. 1 is a schematic view of a stand-alone plotter and associated equipment.

FIG. 1 is schematic, and shows a planar drawing medium 1, a plotter head 2 or 3, a slack umbilical ribbon 4, shown as being disposed vertically on edge and assuming a serpentine configuration a control unit or microprocessor 5, a power unit 6, and a desk-top microcomputer 7 stationary digital electronic data means with keyboard and VDU. Just to give examples, the microprocessor 5 can be an 8-bit single chip microprocessor such as the Motorola 6801 or Hitachi 6301. The microcomputer can be an Apple II. The microprocessor 5 provides a standard interface and accepts a standard, simple set of commands. Suitable commands are known, such as those published for the Hewlett-Packard GL plotter language or any other suitable set of vector commands.

FIGS. 2 TO 7

The plotter head 2 shown in FIGS. 2 to 5 is an experimental head, having a bolted-together metal chassis 11. It has two independently-driven rotary members or propelling in the form of driving wheels 12 supported by the output shafts of electric stepper motors or D.C. motors 13 provided with opto-electronic encoder discs. The axes of the wheels 12 are fixed in relation to the chassis 11, being inclined at 45° to the horizontal, lying in a substantially vertical plane, and intersecting above the level of the centres of the wheels 12. Inclining the axes of the wheels 12 to the horizontal enables their diameter to be smaller, providing high resolution without gearing and thus greater accuracy; the axes of the wheels 12 preferably intersect above (rather than below) the level of the centres of the wheels 12, as this enables the direct drive motors 13 to be positioned inboard of the wheels 12. The wheels 12 could be made for instance of grit-blasted silver steel (hard steel) though any hard-wearing material which has a high coefficient of friction would be suitable. The acceleration expected is less than 1 g, probably about 0.1 g. Ideally, the wheels 12 should have a knife edge, but knife edges cause rutting and a slight radius is provided.

The chassis 11 carries an idle support in the form of a castor wheel 14 which is arranged to swing about a vertical axis in a conventional manner, thereby providing three-point support for the chassis 11.

The chassis 11 also carries a counterweight 15 which is adjustable.

The chassis 11 also carries holders 16 made of plastics material for holding writing or reproducing means in the form of felt-tipped pens 17. The pens 17 are on the other side of the wheels 12 to the castor wheel 14. In this experimental version, no pen lift is provided. The pens 17 are arranged to move up and down in the holders 16 under their own weight, therefore following any undulations in the drawing medium 1. The ink should dry sufficiently well to prevent pick-up.

The chassis 11 also carries opto-reflective sensors 18.

The ribbon 4 is secured by a clamp 19 to the chassis 11 so that it is connected to the plotter head with its width lying in a vertical plane so that the ribbon stands on its edge and supports itself vertically; the ribbon 4 is connected to the microprocessor 5 by another clamp 20 so that its plane is vertical (see FIG. 1).

Just by way of example, the motors 13 can be Portescap 23L motors with a 100 lines encoder, the pens 17 can be HP type plotter pens, e.g. catalogue numbers 5060 to 6818. The sensors 18 can be Honeywell SPX1397 sensors and the ribbon 4 can be a 16 conductor ribbon, 20 mm high.

ALGORITHM FOR MOVEMENT OF PLOTTER HEAD

The movement of the plotter head 2 is modelled by a set of three iterative equations such that for a sequence of pen positions spaced ds apart along a line to be drawn. The necessary wheel movements are determined and used to drive the plotter. In this way, the head 2 tracks a locus, interconverting digital electronic data and two-dimensional positional data on the drawing medium 1. The plotter can be programmed to prevent the wheels 12, 14 leaving the drawing medium 1 when plotting close to the edge.

Figure 6:
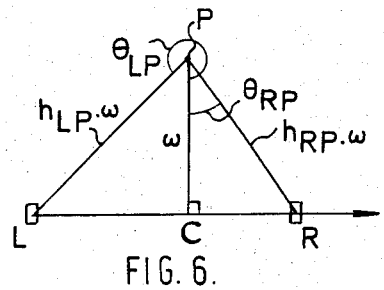
FIGS. 6 and 7 illustrate the geometry of the plotter head.
Figure 7:
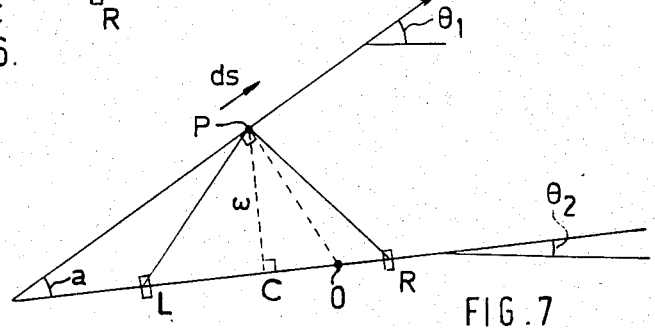

The wheels 12 and writing point 17 are defined as follows:

(i) Each wheel 12 has a point contact L or R with the drawing medium 1 (see FIG. 6).
(ii) The line from L to R is defined as the wheel axis and has an orientation $\theta p$ with reference to an arbitrary reference.
(iii) The writing point P is a distance w from the wheel axis.
(iv) The polar coordinates of each wheel point relative to P are $h_{LP.w}$, $\theta_{LP}$ and $h_{RP.w}$, $\theta_{RP}$ respectively for L, R. Where w, zero is the coordinate of the closest point C on the wheel axis to P and angles are measured anticlockwise relative to the line PC.

For a small incremental movement of ds (expressed e.g. in mm) along a locus, the wheel rotations are given by the following expressions:

$$PL' = PL + \frac{\sin(a + \theta_{LP})}{KL/ds \cdot 1/h_{LP}} \quad (1)$$

$$PR' = PR + \frac{\sin(a + \theta_{RP})}{KR/ds \cdot 1/h_{RP}} \quad (2)$$

Where PL', PR' are new values of PL, PR and PL, PR are the respective initial values of the angular or rotary positions of the wheels, expressed in units relative to an arbitrary reference, as an integer modulo count;

a is initial the angle between the vector (the increment of the line) to be plotted and the wheel axis LR, expressed in radians;

KL, KR are the gains associated with each wheel, i.e. the distance moved per integer unit of PL, PR, expressed as length (e.g. in mm) per unit.

As the point P moves, the plotter head 2 rotates about 0 (instantaneous centre of rotation) and the angle a changes to a', as determined by:

$$a' = a + \frac{\cos a}{w/ds} \quad (3)$$

For ease of computing it is preferable to have all angles expressed in BAM's (Binary angular measure=-rads/$\pi$):

$$a'_{BAM} = a_{BAM} + \frac{\cos a}{\pi w/ds} \quad (4)$$

Finally since $a = \theta_1 - \theta_2$ ($\theta_1$ and $\theta_2$ are the respective angles between the line and the wheel axis and an arbitrary reference axis), the algorithm may be generalised to curves by noting that $$\theta_1' = \theta_1 + pds$$

where $p = 1/R$;
R is radius of curvature of arc being drawn.
Thus $$a'_{BAM} = a_{BAM} + \frac{\cos a_{BAM} + wp}{\pi w/ds} \quad (5)$$

By iterating equations 1, 2 and 5, the wheel sequences can be generated to produce any curve or line at constant speed along the curve or line. expressed generally, i.e. not in BAM's equation 5 becomes:

$$a' = a + \frac{\cos a + wp}{W/ds}$$

Typically by choosing ds such that ($\pi$w/ds) is an exact power of 2 (say 4096), the calculations for a can be done quickly and error free. Also by arranging the divisors in equations (1) and (2) to be in the range 1<DIV<2, the division process can be reduced to one or no subtractions per iteration (the residue is retained to avoid accumulative errors).

With angles expressed in BAM's, sine and cosine functions can be implemented efficently using table interpolation.

SELF-CALIBRATION

Self-calibration can be used to establish or eliminate variation in parameters associated with the device, such as position, orientation and dimensional tolerance associated with the driving wheels 12 and pens 17, and slippage between the driving wheels 12 and the drawing medium 1. For the plotter head 2 accurately to follow the intended line (or for the tracing device to signal accurately), it is necessary that the parameters used in the model exactly match those of the plotter head 2.

In general terms, there are three types of error, parallax, linear scaling and angular scaling. Parallax is mainly due to slight displacement of the pen 17 from the correct position and is non-cumulative and acceptable. Linear scaling errors are cumulative; however, as the drawing medium 1 can expand or shrink by over 1%, linear scaling errors are acceptable if they are less than 1%, and this is normally attainable during manufacture. Angular scaling errors are also cumulative and are less acceptable, for instance giving closing errors on drawing closed curves and significant distortion of the drawing. This requires the track and size of the driving wheels 12 to be determined more precisely than is possible using normal mechanical tolerances, taking account of factors such as the softness of the drawing medium 1 altering the effective diameters of the driving wheels 12.

Specifically referring to the algorithm above, KL, KR and w will cause cumulative errors if they are inaccurate. As $\pi w/ds$ is chosen as an exact power of 2, errors in w merely lead to scaling errors and not geometric distortion. Calibration is therefore only required for the values of (KL/ds) and (KR/ds), which are dimensionless ratios.

SELF-CALIBRATION FOR ANGULAR MOVEMENT

In general terms, the plotter head 2 is signalled to execute a turn through a specific angle, and the error is measured and used to correct the signal. The whole operation can be carried out by pressing one command button, and the signals and the correction can be generated in the microprocessor 5 (functioning as part of "calibrating means"). For convenience, the edge of the drawing medium 1 can be chosen as a datum line—the plotter head 2 can be signalled to move away from the edge before carrying out the turn if the turn is to be through a large angle such as 360° (or a multiple thereof for greater accuracy); the plotter head 2 can be withdrawn from the datum line for instance by turning both wheels 12 or by just turning one wheel 12 and then rotating the plotter head 2 about a, or the other, wheel 12. As an alternative, two edges of the drawing medium at 90° could be used, providing they are sufficiently accurately defined. Particularly if the sensors 18 are outboard of the wheels 12, and optical (or other) marks are placed on the edge of the drawing medium or for instance on a rule, the plotter head 2 could be arranged to start with its wheel axes parallel to the edge, turn through 90°, run along the edge and read a portion of the marks.

In the plotter illustrated, the microprocessor 5 causes the plotter head 2 to carry out the following calibration sequence:

(i) Align the wheel axis exactly with the edge of the paper or other "secondary device" using the sensors 18 which are immediately in front of each driving wheel 12. The alignment can be achieved using a suitable algorithm providing successive approximations—such algorithms are well known.

(ii) Rotate plotter head 2 through 60° about left wheel 12 (to move right wheel 12 towards the centre of the drawing medium 1);

(iii) Rotate plotter head 2 through 360° about right wheel 12;

(iv) Rotate plotter head 2 back through 60° about left wheel 12;

(v) Realign and estimate angular error;

(vi) Update software model for right wheel 12;

(vii) Repeat for left wheel 12.

Using a suitable algorithm, the sensors 18 are brought within an initial step distance (say about 3 mm) from the edge and this distance is then reduced to 1 machine step. The reading of the two sensors 18 will define one of four appropriate directions (backwards, forward, left or right) for the selected pen 17 to move in order to bring the sensors 18 closer to the edge. A suitable routine is:

(a) Enter with plotter head 2 facing edge and valid parameters for the centre pen 17;
(b) Set initial step size;
(c) Clear Alpha (the accumulator of net rotation);
(d) While step size not equal to zero,
   reset flags used to indicate sensors 18 have changed state;
   read actual sensor states;
   set overrun count (say at 20 steps, to prevent plotter head 2 looking round the whole loop); while both sensors 18 not changed and overrun not zero:
   decrease overrun;
   save sensor states for later use;
   deduce appropriate direction from table (in microprocessor 5) in dependence on sensor states;
   add to Alpha;
   call line subroutine to execute move in direction Alpha by a distance of one step (this subroutine up-dates Alpha to reflect rotation of plotter head 2);
   subtract direction from Alpha (Alpa now only contains nett plotter head rotation from start, i.e. alignment error);
   read sensors 18 and compare to saved states;
   update sensor flags (of one or both sensors 18 have changed);
   endwhile;
   reduce step size (step size is halved to give successive approximation);
(e) endwhile routine;
(f) exit from procedure (sensors 18 are now aligned and Alpha contains initial angle of sensor line relative to edge).

Once the angular error has been determined, the microcomputer 5 can derive either the total number of steps to execute respective 360° rotations of the plotter head 2 with each wheel 12, or the net rotation of the plotter head 2 for a given number of steps.

In general terms, even if there is no automatic self-calibration, there can be means for sensing the position and orientation of the plotter head 2 in relation to a datum line, possibly additionally with means for sensing the position of the plotter head 2 in relation to a second datum line making an angle with the first datum line; the datum lines may for instance be two edges of the drawing medium. In general, any means can be used to establish an initial or datum position, for instance an obstacle if the wheels 12 do not slip significantly on stalling.

FIGS. 8 TO 10

The plotter head 3 of FIGS. 8 to 10 is in principle very similar to that of FIGS. 2 to 5, and the same references are used for identical or similar parts.

In this case, the plotter head 3 has a moulded plastic or die cast metal chassis 21 which is suitable for mass production. Encoder discs 22 and associated opto-electronic readers 23 are indicated in FIGS. 8 and 9, the readers 23 being mounted directly on a printed circuit board 24. The motors 13 are supported by a bearing system indicated conventionally in FIG. 9 and by a screwed-on plate 25.

Counterbalancing is performed by electro-magnets 26 which operate pen lifts. In this embodiment, the pens 17 (three different pens 17 are shown in FIG. 10) are push fits in their holders or adaptors 16, which in turn are loose fits in suitable cavities in the chassis 21. As shown best in FIG. 10, each electromagnet 26 is associated with an armature 27 which is fixed to the end of a double lever 28 made of a suitable plastics material such as acetyl. The lever 28 has an integrally-moulded pivot pin 29 which is a snap fitting in the chassis 21. The long arm of the lever 28 is of inverted T-section (see FIG. 9), but the flanges are divided from the centre web by slits 30 (see FIG. 8). In the at-rest position of the lever 28 (shown dashed in FIG. 11), the flanges rest on small shoulders 31 forming part of the chassis 21. When the electromagnet 26 is energised, the centre web of the lever 28 is pushed down, allowing the pen 17 to drop onto the drawing medium 1 while the flanges bow and apply an anticlockwise spring force to the lever 28.

FIG. 11

The tracer head or tracing device 41 is constructively strictly analagous to the plotter head 2 (or 3), and need not be described in detail. Conventional counters 42 are connected to the wheels 12 to signal their rotation. The microprocessor 5 (FIG. 1) acts as a receiving device for receiving signals from the counters. The centre pen of the plotter head 2 is replaced by a reproducing or tracing means or in the form of a tracing tip or a fibre-optic bundle formed as a vertical cylindrical bar 43, polished at each end, in a plastic housing 44. The lower end of the bar 43 is close to or in contact with the drawing medium 1 and has a dot or cross 45 on it. Light enters the top face of the bar 43 and provides sufficient illumination to e.g. follow a line. A suitable tracing means is a Hewlett-Packard digitising-sight HP 09872 60066. The head 41 may be propelled by hand and gripped at any suitable location, which will act as propelling means. The microprocessor 5 (FIG. 1) acts as a receiving device for receiving signals from the counters 42 thereby tracking a locus or line on the drawing medium 1 and interconverting digital electronic data in two-dimensional positional data on the drawing medium 1.

I claim:

1. A self-propelled drawing device for moving upon a drawing medium, the device comprising:
    a chassis;
    two independently-rotatable rotary members mounted to said chassis for rotating about axes which are fixed relative to said drawing device, said rotary members being adapted to roll on said drawing medium;
    independent drive means connected to said rotary members for driving said rotary members and thereby driving said drawing device, whereby the path followed by said drawing device is determined by the individual rotations of said rotary members; and
    at least one writing means associated with said chassis at a point distanced from an imaginary line joining points of contact of said rotary members with said drawing medium, said writing means being adapted to mark said drawing medium.

2. The drawing device of claim 1, wherein said rotary member axes are inclined to the horizontal and intersect above the level of the centres of said rotary members.

3. The device of claim 1, further comprising means for self-calibration for angular movements in communication with said drawing device, said self-calibrating means causing said drawing device automatically to:
    execute a turn about a first said rotary member from a first angular position to a second angular position;
    determine the angle between said second position and a third position which is a known angle from said first position and angularly close to said second position, by turning into said third position; and
    repeat the procedure when turning about the second said rotary member.

4. The device of claim 3, wherein said self-calibrating means causes said drawing device to:
    execute a specific movement away from a datum position;
    execute a turn through 360° or a multiple thereof about said first rotary member;
    execute said specific movement in reverse;
    reposition itself in said datum position; and
    repeat the procedure when turning about said second rotary member.

5. The drawing device of claim 1, further comprising an idle support associated with said chassis for moving over said drawing medium, said idle support in conjunction with said rotary members providing a three-point support for said drawing device, and said writing means being on the opposite said of said imaginary line from said idle support.

6. The drawing device of claim 1 further comprising a stationary control device in communication with said drawing device for sending signals to said drawing device thereby controlling the movement of said drawing device, said stationary control device comprising electric circuitry arranged to interate the following equations:

$$PL' = PL + \frac{\sin(a + \theta_{LP})}{KL/ds \cdot 1/h_{LP}};$$

$$PR' = PR + \frac{\sin(a + \theta_{RP})}{KR/ds \cdot 1/h_{RP}};$$

$$a' = a + \frac{\cos a + wp}{w/ds};$$

where PL and PR are the respective initial values of the angular positions of said rotary members, expressed in units relative to an arbitrary reference;
    PL' and PR' are the respective new values of PL and PR after a small increment of said line;
    a is the angle between said small increment and said imaginary line;
    $\theta_{LP}$ and $\theta_{RP}$ are the angles of the imaginary lines between the respective point contacts of said rotary members with the drawing medium and the point at which the writing means marks the drawing medium;
    KL and KR are the respective distances moved by each said rotary member per unit in which said angular positions are expressed; ds is said small increment;
    $h_{LP}$ and $h_{RP}$ are the respective ratios (compared to w) of the distances from the point where said writing means marks the drawing medium to the points where said rotary members contact the drawing medium;
    a' is the new value of angle a;
    w is the distance from the point where said writing means marks the drawing medium to the closes point thereto on said imaginary line joining points of contact of said rotary members with the drawing medium; and p is the reciprocal of the radius of curvature of said small increment, thereby generating the sequences of rotary movements of said rotary members and producing a line on the drawing medium.

7. A tracing device for tracing from a medium, the device comprising:
a chassis;
two independently-rotatable rotary members mounted to said chassis for rotation about axes fixed relative to said tracing device said rotary members being adapted to roll on said medium, whereby the individual rotations of said rotary members correspond to the path followed by said tracing device;
means connected to said rotary members for sensing and signalling the individual rotations of said rotary members; and
at least one tracing means associated with said chassis at a point which is not on an imaginary line joining points of contact of said rotary members with said medium.

8. The tracing device of claim 7, wherein said rotary member axes are inclined to the horizontal and intersect above the level of the centres of said rotary members.

9. The tracing device of claim 7 further comprising an idle support associated with said chassis for moving over said drawing medium, said idle support in conjunction with said rotary members providing a three-point support for said tracing device, and said tracing means being on the opposite side of said imaginary line from said idle support.

10. A plotter comprising:
a self-propelled plotter head for moving upon a drawing medium;
a stationary control device for sending signals to said plotter head and thereby controlling the movement of said plotter head;
a non-rectilinear ribbon comprising flexible conductors connecting said plotter head to said control device for passing said signals from said control device to said plotter head, said ribbon being flexible and slack in the area of said drawing medium; and
means connecting said ribbon to said plotter head and to said control device so that the width of said ribbon is positioned vertically on edge on said drawing medium and said ribbon assumes a generally serpentine configuration in the area of said drawing medium whereby minimal restraint is exercised on said plotter head as it moves on said drawing medium.

11. A tracer comprising:
a tracer head adapted to be moved over a medium for sending signals corresponding to the movement of said tracer head;
a stationary receiving device for receiving said signals;
a non-rectilinear ribbon comprising flexible conductors joining said tracer to said receiving device for passing said signals from said tracer head to said receiving device, said ribbon being flexible and slack in the area of said medium; and
means connecting said ribbon to said tracer head and to said receiving device so that the width of said ribbon is positioned vertically on edge on said medium and said ribbon assumes a generally serpentine configuration in the area of said medium whereby minimal restraint is exercised on said tracer head as it moves on said medium.

12. A self-propelled drawing device for moving upon a drawing medium, the device comprising:
a chassis;
two independently-rotatable rotary members mounted to said chassis for rotating about axes which are fixed relative to said drawing device, said rotary members being adapted to roll on said drawing medium;
two independent drive means connected to said rotary members for driving said rotary members and thereby driving said drawing device, whereby the path followed by said drawing device is determined by the individual rotations of said rotary members;
at least one writing means associated with said chassis at a point distanced from an imaginary line joining points of contact of said rotary members with said drawing medium, said writing means being adapted to mark said drawing medium; and
means for sensing the position and orientation of said drawing device in relation to at least one datum location positioned on said chassis.

13. The device of claim 12, further comprising means for self-calibration for angular movements in communication with said drawing device, said self-calibrating means causing said drawing device automatically to:
execute a turn about a first said rotary member from a first angular position to a second angular position;
determine the angle between said second position and a third position which is a known angle from said first position and angularly close to said second position, by turning into said third position; and
repeat the procedure when turning about the second said rotary member.

14. The device of claim 13 wherein said self-calibrating means causes said drawing device to:
execute a specific movement away from a datum position;
execute a turn through 360° or a multiple thereof about said first rotary member;
execute said specific movement in reverse;
reposition itself in said datum position; and
repeat the procedures when turning about said second rotary member.

15. The drawing device of claim 12, wherein said rotary member axes are inclined to the horizontal and intersect above the level of the centers of said rotary members.

* * * * *